(12) United States Patent
Chike et al.

(10) Patent No.: US 10,946,546 B2
(45) Date of Patent: Mar. 16, 2021

(54) APPARATUS AND METHOD FOR AUTOMATED BLADE CHANGE FOR TISSUE SAW

(71) Applicant: Paper Converting Machine Company, Green Bay, WI (US)

(72) Inventors: Matthew J. Chike, Luxemburg, WI (US); Stefano Spinelli, Green Bay, WI (US); Cory P. Gussert, Pulaski, WI (US); Jonathon T. Zahn, Green Bay, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 55 days.

(21) Appl. No.: 16/109,028

(22) Filed: Aug. 22, 2018

(65) Prior Publication Data

US 2019/0070744 A1   Mar. 7, 2019

Related U.S. Application Data

(60) Provisional application No. 62/553,244, filed on Sep. 1, 2017.

(51) Int. Cl.
*B27B 5/18* (2006.01)
*B23D 47/00* (2006.01)
(Continued)

(52) U.S. Cl.
CPC .............. *B27B 5/18* (2013.01); *B23D 45/003* (2013.01); *B23D 45/10* (2013.01); *B23D 47/00* (2013.01);
(Continued)

(58) Field of Classification Search
CPC .. B27B 5/18; B27B 1/002; B27B 5/32; B27B 33/08; B27B 1/00; B23D 45/003; B23D 45/10; B23D 45/00; B23Q 3/155
(Continued)

(56) References Cited

U.S. PATENT DOCUMENTS 3,709,623 A * 1/1973 Stephan ................ B23B 31/265
                                                     408/22
RE30,598 E    5/1981 Spencer
(Continued)

FOREIGN PATENT DOCUMENTS

DE   10117951 B4   6/2004
EP    3186042 B1   3/2019
(Continued)

OTHER PUBLICATIONS

International Search Report and Written Opinion for PCT/US2018/047642 dated Nov. 9, 2018.

*Primary Examiner* — Ghassem Alie
*Assistant Examiner* — Nhat Chieu Q Do
(74) *Attorney, Agent, or Firm* — Thompson Coburn LLP

(57) ABSTRACT

A blade storage array is detachably mountable with a tissue log cutting saw. The saw has a cutting arm with a tool holder receptacle adapted and configured to hold a circular saw blade for the saw. The array has a plurality of storage units. Each storage unit is adapted and configured to store a circular saw blade for the saw. Each storage unit has a tool holder receptacle adapted and configured to hold a circular saw blade. Each storage unit is adapted and configured to move perpendicularly to the saw blade center axis.

16 Claims, 13 Drawing Sheets

(51) Int. Cl.
*B23D 45/00* (2006.01)
*B23D 45/10* (2006.01)
*B27B 1/00* (2006.01)
*B27B 5/32* (2006.01)
*B27B 33/08* (2006.01)

(52) U.S. Cl.
CPC ............... *B27B 1/002* (2013.01); *B27B 5/32* (2013.01); *B27B 33/08* (2013.01); *B23D 45/00* (2013.01); *B27B 1/00* (2013.01)

(58) Field of Classification Search
USPC ............................... 483/4, 7, 10, 11, 16, 901
See application file for complete search history.

(56) References Cited

U.S. PATENT DOCUMENTS

| | | | |
|---|---|---|---|
| 4,528,743 A * | 7/1985 | Bleich | B24B 45/003 451/342 |
| 4,907,337 A | 3/1990 | Krusi | |
| 5,115,403 A | 5/1992 | Yoneda et al. | |
| 5,557,997 A | 9/1996 | Wunderlich et al. | |
| 6,123,002 A | 9/2000 | Wunderlich et al. | |
| 6,467,616 B2 * | 10/2002 | Hegarty | G11B 33/0477 206/308.1 |
| 7,284,660 B2 | 10/2007 | Smith | |
| 7,370,758 B2 * | 5/2008 | Smith | B23D 59/00 206/349 |
| 7,520,386 B1 * | 4/2009 | Griffin | B25H 3/00 206/303 |
| 8,202,206 B2 * | 6/2012 | Feinauer | B23Q 3/15503 483/1 |
| 2006/0169111 A1 * | 8/2006 | Kozlowski | B23D 59/003 83/13 |
| 2009/0025521 A1 | 1/2009 | Mammel | |
| 2009/0134050 A1 * | 5/2009 | Miller, III | B65D 81/127 206/374 |
| 2011/0174122 A1 | 7/2011 | Braun et al. | |
| 2016/0091887 A1 | 3/2016 | Kubo et al. | |
| 2017/0239833 A1 * | 8/2017 | Mazzaccherini | B23Q 3/155 |

FOREIGN PATENT DOCUMENTS

| | | | |
|---|---|---|---|
| EP | 3479975 A1 | 5/2019 | |
| WO | 2016030124 A1 | 3/2016 | |
| WO | WO-2016129103 A1 * | 8/2016 | ............. B23Q 3/155 |

* cited by examiner

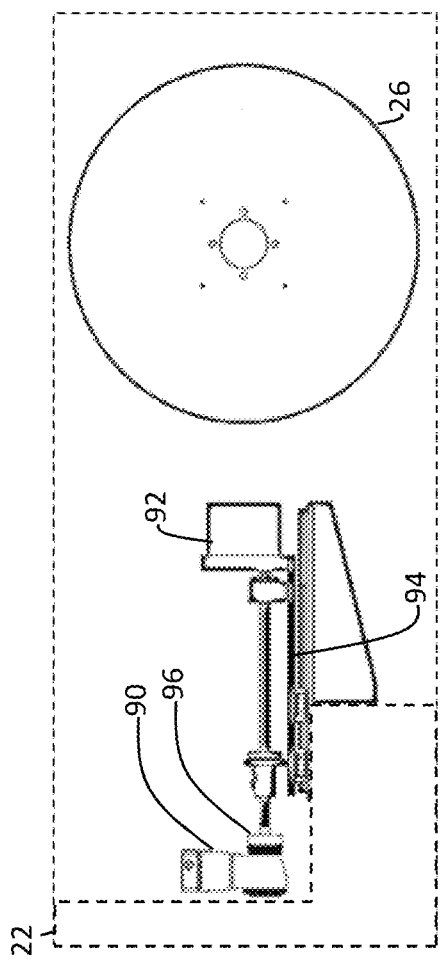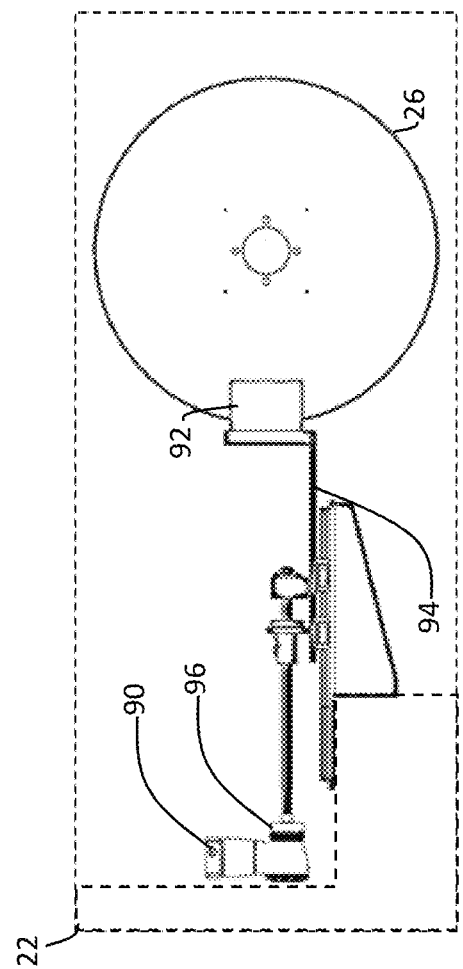
FIGURE 19
FIGURE 20

APPARATUS AND METHOD FOR AUTOMATED BLADE CHANGE FOR TISSUE SAW

CROSS-REFERENCE TO RELATED APPLICATIONS

This application claims the benefit of provisional application Ser. No. 62/553,244, which was filed on Sep. 1, 2017, the disclosure of which is incorporated by reference herein.

SUMMARY

This disclosure relates to a system for the automatic changing of a blade for a tissue log saw. The blades for the tissue log saw are stored in an array of storage units. Each storage unit in the array is configured to store a blade for the saw. Each storage unit is also extendable from the array to allow a stored blade to be loaded from the storage unit to the cutting head and to allow an expired blade to be received into the storage unit from the cutting head. When the array is interfaced with the saw, at least one storage unit in the array is empty to receive an expired or used blade from the saw, and the remainder of storage units in the array are preloaded with blades for the processing operation. The system facilitates tracking and inventory of blades, and allows the array of storage units to be moved to a location in a converting facility suited for inspection of the blades, removal of the blades from the storage units, and insertion of blades into storage units. The system minimizes the interaction of machine operators and maintenance personnel with the blades.

DESCRIPTION OF DRAWINGS

FIG. 19 shows a cleaning member of the blade cleaner of FIG. 18 in a retracted position with the storage unit arm and blade tool holder not shown for ease of illustration.

FIG. 20 shows a cleaning member of the blade cleaner of FIG. 18 in an extended position with the storage unit arm and blade tool holder not shown for ease of illustration.

DETAILED DESCRIPTION

Figure 1:
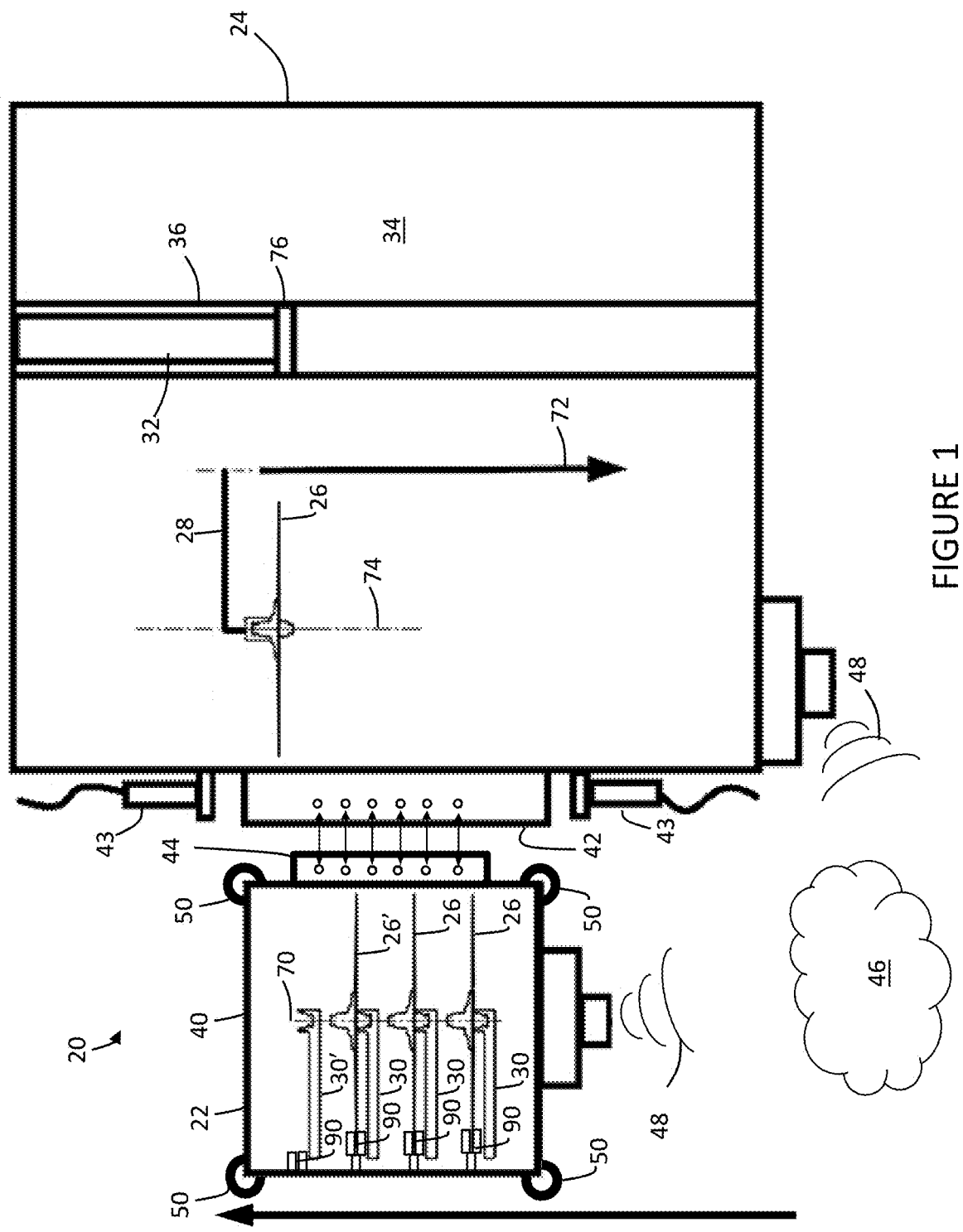
FIG. 1 illustrates in a top plan view an array moving into position relative to a saw with the array having an empty storage unit and other storage units in the array each having a blade, with a cutting arm of the saw in an exchange position to transfer an expired blade into the empty storage unit of the array.
Figure 2:
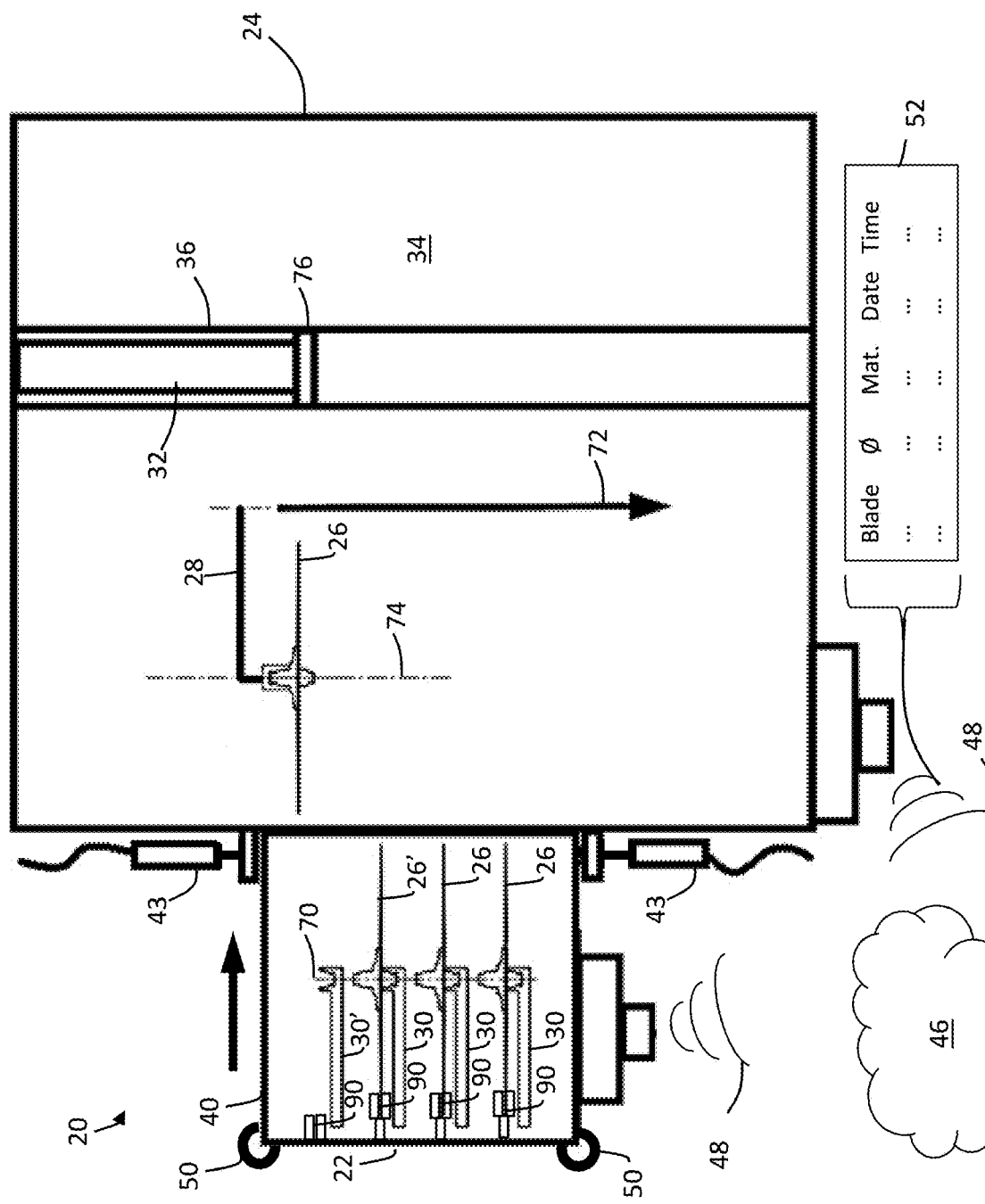
FIG. 2 illustrates the array releasably connected with the saw, and the empty storage unit in position to enter the saw house to receive the expired blade from the saw cutting arm.

The exemplary system 20 described below and shown in the drawings includes an array 22 that interfaces with a saw 24 and provides blades 26 for a cutting arm 28 of the saw through a plurality of storage units 30 arranged in the array. Each storage unit 30 in the array 22 is configured to store a blade 26 for the saw 24. The saw 24 may be configured to cut tissue logs 32 entering a saw house 34 on a conveyor 36. In a general sense and as further modified as described below, the saw 24 and the cutting arm 28 may be of the type, for instance, as shown by way of example and not in any limiting sense, in U.S. Pat. Nos. RE30,598, 5,557,997, and 6,123,002 the disclosures of which are incorporated by reference herein. The array 22 of storage units 30 could thus contain many blades 26 for the saw 24 for a particular saw cutting operation or procedure as may be required by the application. As will be described below, each storage unit 30 is configured to store, receive, and transfer the blade 26, whether a new blade, an expired blade, or partially-used blades for later use. The array may move in a direction generally parallel to the saw blade center axis. The movement may be independent of the saw or the array may move once coupled with the saw 24. In addition or alternative, the storage units in the array may move in a direction generally parallel to the saw blade center axis relative to the saw once the array is coupled to the saw. In addition or alternative, the storage units may be stationary in the direction of travel of the saw blade center axis once the array is coupled with saw, and the saw may move as necessary. In each case, the array and/or storage unit may move, as needed to receive an expired blade, and load and mount a next-in-queue blade for use on the saw cutting arm. As used herein, the term "expired" means that the blade condition is used such that it is no longer suitable for the particular processing operation currently being conducted on the saw, and not necessarily that the blade is to be scrapped, and the term "new" means blades that have been readied for a particular saw processing operation, and not necessarily that the blades are new from a vendor or supplier or have never been used.

The array 22 may comprise a housing 40 configured to hold the plurality of storage units 30. The array 22 may be portable and may be detachably mounted to the structure comprising the saw 24 and saw house 34. An interface 42 may be built into a wall panel or other structural member of the saw house 34 to provide a detachable mount for the array 22 of storage units 30. The interface 42 may allow the array 22 to be physically, mechanically, electrically, and/or electronically detachably mounted to a wall panel or other structural member of the saw house 34. A system of cooperating connectors, for instance, pneumatic or hydraulic actuators 43 may engage with each and/or cooperate to secure the array 24 to the saw housing 34. The interface 42 may provide a connection point 44 for the array 22 to mechanically connect with the saw. For instance, in one embodiment, the array may have a linkages or mechanical actuators that connect with cooperating linkages or mechanical actuators on the saw via the interface, thereby allowing the linkages on the array to be actuated via the saw. In other words, the linkages on the array may connect with linkages on the saw when the array is detachably mounted to the saw, so the linkages on the array are an extension of those on the saw. In this manner, movement of the storage unit between the retracted and extended position, and actuation of the storage unit blade tool holder receptacle, all of which will be described below, may be accomplished via mechanical linkages extending from the saw to the array. This would dispense with the need to provide electronic control systems on the array. In addition or alternative, the array 22 may be configured to draw electrical power and/or pneumatic or hydraulic fluid sources from the saw 24. The array 22 may also have an on-board rechargeable battery to power electrical and electronic equipment on the array or draw electrical power from another external source (not shown). The array 22 may also be equipped with pneumatic or hydraulic actuators. The interface 42 and the connection point 44 may be configured to supply the array 22 with pneumatic or hydraulic fluid from the saw. The array 22 may also draw pneumatic or hydraulic fluid from the facility through external connections (not shown). The array may also have on board pumps to supply pneumatic or hydraulic fluid to respective components on the array. Accumulators, valves, and other conventional equipment needed for pneumatic or hydraulic actuation systems may be provided on the array, as applicable. As will be explained below in greater detail, the array 22 may also be electronically coupled to the saw 24 at the interface 42 and connection point 44 so control signals generated by the saw may be transmitted to the array for certain array based functions, and signals from the array may be transmitted to the saw for certain saw based functions. The transmission may be through a network 46 and may be wireless 48. The array 22 of storage units 30 may be provided in the form of a cart with wheels (e.g., swivel casters) 50 that may be maneuvered to a position that allows the cart to mount directly with the saw house 34 via the interface 42. The movement may be manual or automated via a track or other guidance system. The array of storage units in the form of a rolling cart allows the array to be maneuvered into the tight spaces on the converting floor that are usually found around the saw house and structure of the saw.

Once all the blades in the array of storage units are expired, the array of storage units can be unmounted from the saw house and transported to an area where blade disposition occurs. The blade disposition location is preferably not on the converting floor, but in a more remote area with plenty of space, lighting, and other support for safe handling and disposal of the expired blades.

For a saw or saw cutting process, two or more portable arrays of storage units may be provided. For example, once all the blades in the "in use" array of storage units are expired (e.g., of an unusable diameter for the particular processing operation currently being conducted), the second fully stocked array of storage units with new blades may be brought online, mounted to a wall panel or other structural member of the saw house via the interface, and quickly exchanged with the array of storage units with the expired blades. In this way, the restocking of the array of storage units reduces potential operational bottlenecks in the saw cutting operation.

In another aspect, the arrays may be part of a subscription system provided by a supplier. The supplier may have multiple arrays that may be provided to a customer for use. When the blades in a particular array are expired, the customer may return the array to the supplier for a new array of blades. The array may form a part of a shipping container to allow transport of the array between the supplier and the customer. Once an array is returned to the supplier, the array may be restocked with new or refurbished blades and calibrated for reuse. Functional aspects of the array may be checked and repaired as necessary. The supplier may collect and analyze blade operational data from returned arrays and provide recommendations and service bulletins in connection with the array or saw to customers. The data collection and analysis may be used for general product improvement.

The array 22 of storage units 30 may have a power supply, sensors, motion detectors, a computer processor, a memory storing data, and computer equipment that allows the array to connect to the network 46 with a like or another computer system or programmable logic control for the saw via the interface 42 and the connection point 44. The array memory may store data structures of information 52 regarding the blades that are currently stored in the unit. Each storage unit 30 may also be equipped with like equipment so the blade information is maintained at the storage unit level. In one example, the array and/or the storage unit may be configured with a RFID device (e.g., a label or tag). The saw 24 may be configured to read and/or write to the RFID device on the array, storage unit or blade. The information 52 may include blade diameter, blade material, last saw cutting operational data, last inspection, last sharpening, last run-time, cumulative run-time, etc. The blade information 52 may also include information about a specific blade or storage unit that should be bypassed in the array and not used in the saw cutting operation because of a maintenance condition or expired inspection status. Information 52 regarding a blade may be transferred on the network 46 between the saw 24 and the array 22 so the array may correlate specific information about a blade and a storage unit 30. Information 52 from the saw 24 may be downloaded to the array 22 so the array stores information about each blade and its respective storage unit 30. The download of information may occur during operation with the array connected to the saw and/or prior to removing the array from the saw. The download of information 52 may occur via the network 46 or via the interface 42 and the connection point 44. Information 52 including blade data from the array 22 may also be uploaded to the saw 24 once the array is mounted to the saw at the interface 42. The upload of information 52 may occur via the network 46 or via the interface 42 and the connection point 44. Storing information about each blade via the array allows for the reuse of blades. For instance, a blade that has been previously used in connection with processing large diameter rolls may still have a diameter sufficient to allow processing for smaller diameter rolls. If a blade became too small for a particular product or processing operation at the time it was in use, it could be retrieved and used again in connection with a subsequent product or processing operation. An array of storage units containing partially used blades could be used in a different saw cutting operation, and the array or storage unit RFID label information may be uploaded to the saw so that the saw and array may synchronize (and/or the storage units may sequence) in a manner necessary to mount the correct diameter blade for the desired process.

Each blade 26 may define a plane 60 (FIG. 5) with one side facing the cutting arm 28 of the saw 24 and the opposite side of the plane facing the storage unit 30. Each blade 26 may be configured with a tool holder 62 on the saw cutting arm 28 facing side of the plane 60 and a tool holder 64 on the storage unit 30 facing side of the plane. The saw 24 may be configured such that the saw cutting arm 28 has a tool holder receptacle 66 adapted and configured to engage the blade tool holder 62 on the saw facing side of the blade. Each storage unit 30 may have a tool holder receptacle 68 adapted and configured to engage the tool holder 64 on the storage unit 30 facing side of the blade. Each storage unit 30 may be configured to store the blade in a generally vertical configuration such that the axis of rotation 70 (FIG. 1) of the stored blade is generally horizontal and parallel to the direction of the log travel 72 (FIG. 1). The array 22 may also include one or more empty storage units 30' (FIGS. 1-3, 15-17) to the extent the saw already has one or more blades already mounted in the saw. Each storage unit 30 may have a hollow interior sufficient to accommodate the geometry of a blade 26 and an opening into the hollow interior sufficient to expose the storage unit tool holder receptacle 68 and allow the blade to be received in the hollow interior of the storage unit. The tool holder receptacle 68 of the storage unit 30 secures the blade in the hollow interior to prevent unwanted movement of the blade in the storage unit. The tool holder receptacle 68 in the storage unit may be similar or cooperate with the tool holder receptacle 64 used on the saw cutting arm to make exchange between the saw cutting arm and the storage unit simple and universal. In one example, the blade 26 may be secured on the saw arm 28 and inside the storage unit 30 with a collet mechanism. In this example, the blade tool holder 62,64 may comprise a male end of a collet that is mounted on both sides of the center of the blade 26 at the blade cutting axis 74 (FIG. 1), and both the saw arm and the storage unit tool holder receptacles 66,68 may comprise the cooperating female portion of the collet mechanism. The collet mechanism on the saw arm 28 and the storage unit 30 may oppose each other when the storage unit is brought into register with the saw cutting arm. In other words, the male collet on one side of the blade may interface into the saw arm and the male collet on the opposite side of the blade may be for interface into the storage unit. In the alternative to a collet mechanism, the tool holder receptacle on the storage unit or saw cutting arm may be a chuck mechanism, a jaw-chuck mechanism, or other cooperating system of tapered sleeves configured to receive an arbor, tapered sleeve or fixture mounted to the saw blade.

Figure 3:
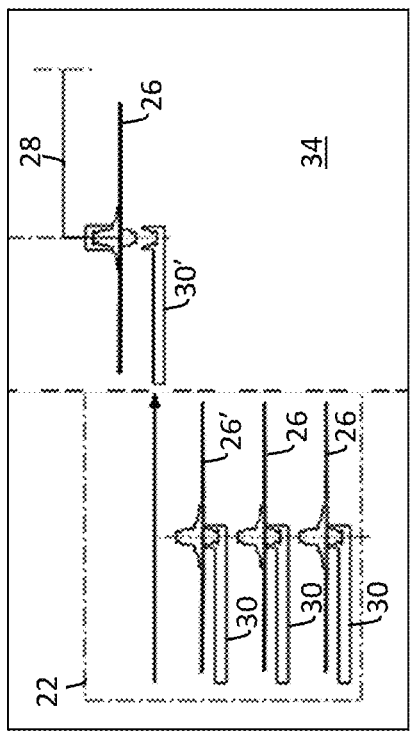
FIG. 3 illustrates the empty storage unit entering a saw house of the saw.
Figure 4:
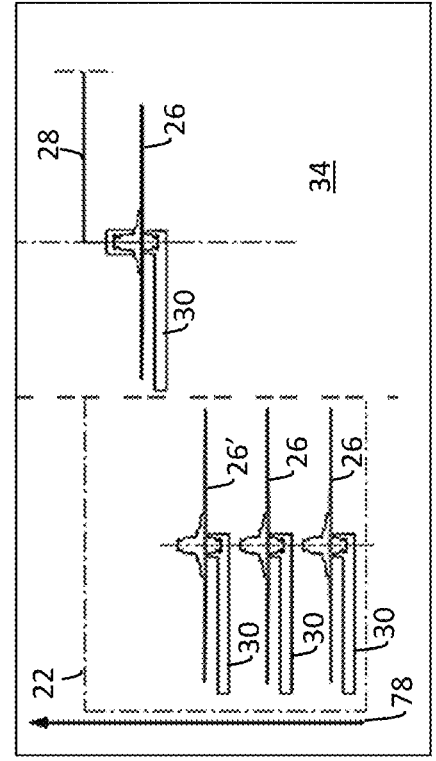
FIG. 4 illustrates the empty storage unit in position to receive the expired blade from the saw cutting arm.
Figure 5:
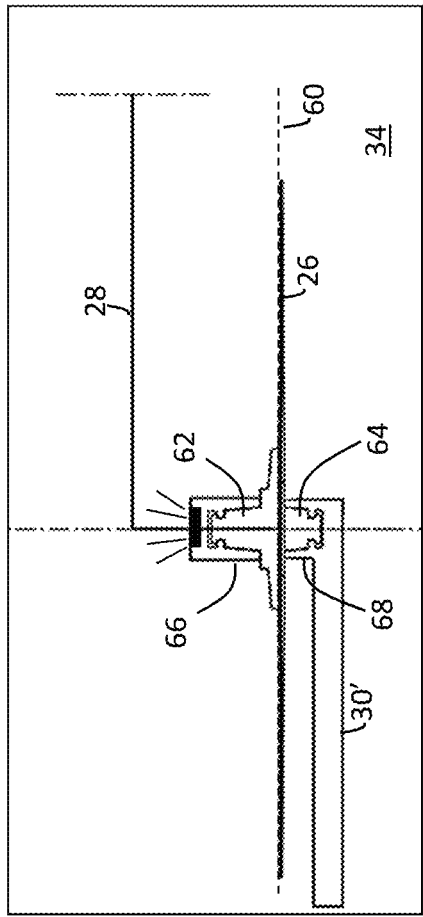
FIG. 5 provides further detail of the exchange of the expired blade between the saw cutting arm and the empty storage unit with a tool holder receptacle of the saw arm activated to engage a tool holder of the saw blade and a tool holder receptacle of the storage unit deactivated prior to engagement of an opposite side tool holder of the saw blade.
Figure 6:
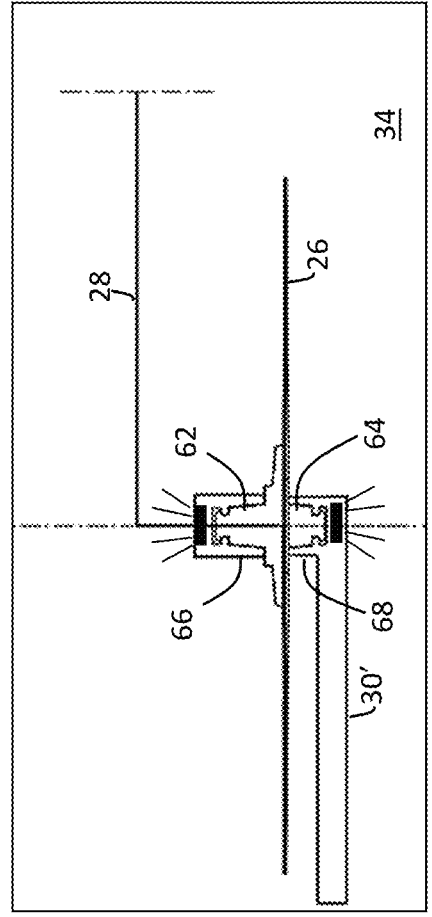
FIG. 6 provides further detail of the exchange of the expired blade between the saw cutting arm and the empty storage unit with the tool holder receptacle of the saw arm activated to engage the saw blade tool holder and tool holder receptacle of the storage unit activated to engage the opposite saw blade tool holder.
Figure 7:
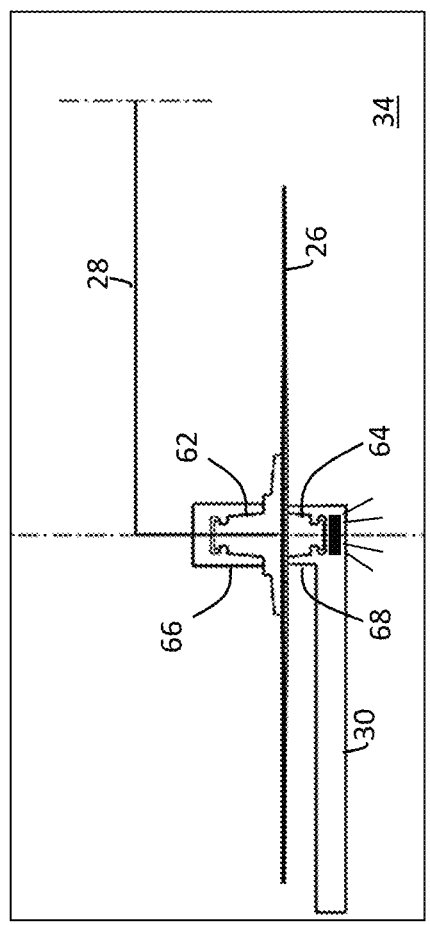
FIG. 7 provides further detail of the exchange of the expired blade between the saw cutting arm and the empty storage unit with the tool holder receptacle of the saw arm deactivated to release the saw blade tool holder and tool holder receptacle of the storage unit activated to engage the opposite side saw blade tool holder.
Figure 8:
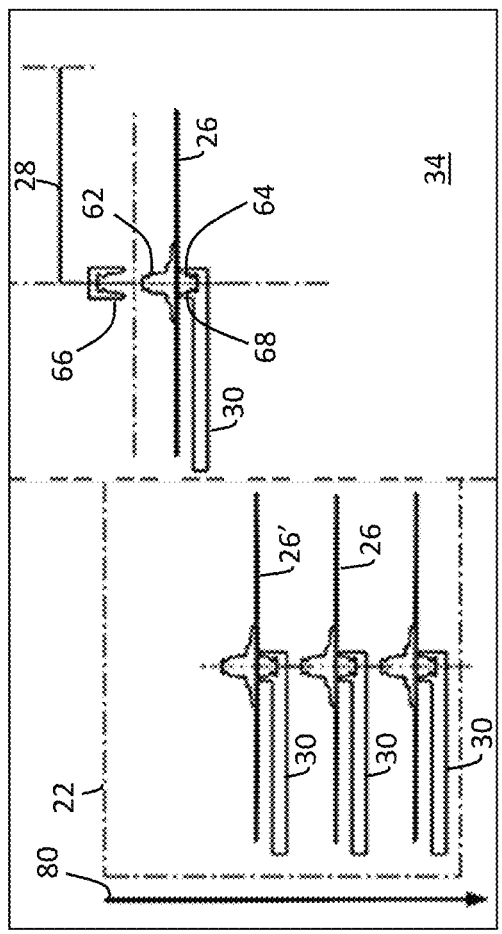
FIG. 8 shows the previously empty storage unit with the expired blade moving away from the saw cutting arm.
Figure 9:
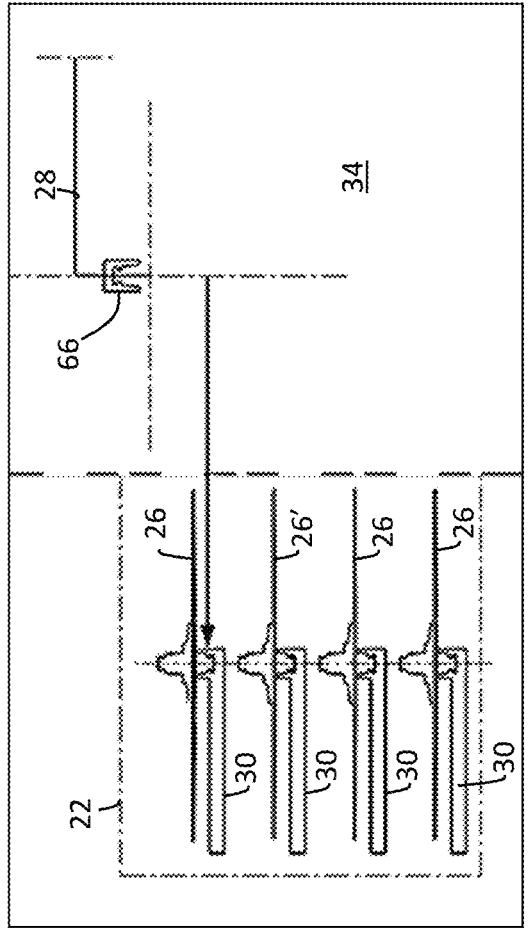
FIG. 9 shows the previously empty storage unit with the expired blade moving back to the array.

FIGS. 1-17 illustrate an exemplary sequence of operations to remove an expired blade from the saw arm 28 and to install the new, next in queue stored blade 26' onto the saw arm. The array 22 may be configured such that motion of one storage unit in the array may be independent of the motion of another storage unit. For instance, each storage unit 30 of the array may be configured to move linearly from the array into the saw house 34 independently of another storage unit. In addition, the array of storage units 30 may also be configured to move in the direction of log travel 72. When a blade exchange needs to be performed, the saw cutting arm 28 may go to a pre-determined position, for instance, left of the cutting gap 76 (FIGS. 1-2) in the conveyor 36. The empty storage unit 30' in the array of storage units may move from the retracted position in the array (FIGS. 1-2) to the extended position away from the array and into the saw house such that the empty storage unit is placed in alignment with the saw cutting arm as shown in FIG. 3. Then, as shown in FIGS. 4-5, the entire array 22 of storage units 30 may move the appropriate distance in a direction 78 parallel to the direction 72 of the travel of the log 32 to bring the empty storage unit 30' to a position immediately adjacent to the saw cutting arm 28. As shown in FIG. 6, the tool holder receptacle 68 on the empty storage unit 30' may then secure the blade tool holder 64 on the storage unit side of the blade 26. At this point, the storage unit 30 may be physically connected to the saw 24. As shown in FIG. 7, the saw cutting arm tool holder receptacle 66 may then release the blade tool holder 62 on the saw cutting arm 28 side of the blade 26. At this point, the transfer of the blade from the saw cutting arm to the storage unit is complete. As shown in FIG. 8, the array 22 of storage units 30 may then move away from the saw arm 28 in a direction 80 parallel to the log travel direction 72 a distance sufficient to enable the tool holder 62 extending from the saw cutting arm side of the blade 26 to clear from the saw cutting arm 28. As shown in FIG. 9, once clear, the storage unit 30 may move from the extended position in the saw house 34 to the retracted position back into the array 22.

Figure 10:
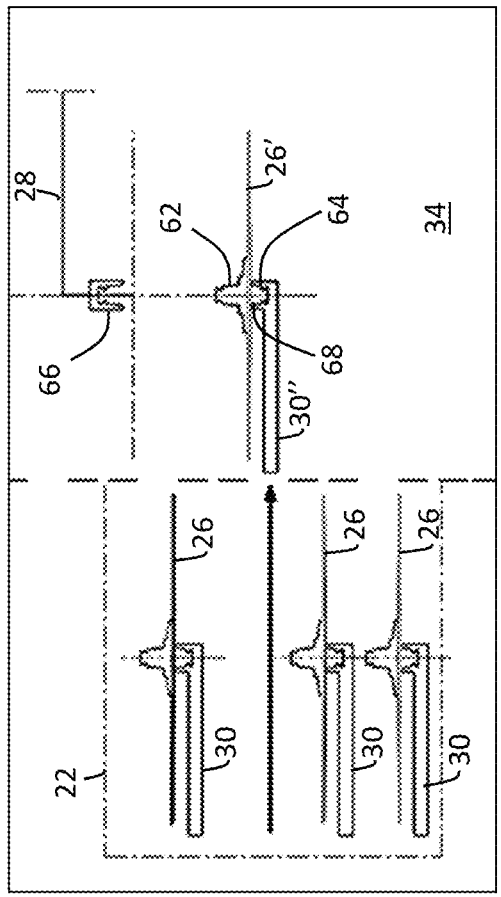
FIG. 10 shows a full storage unit with a next in queue stored blade moving into the saw house.
Figure 11:
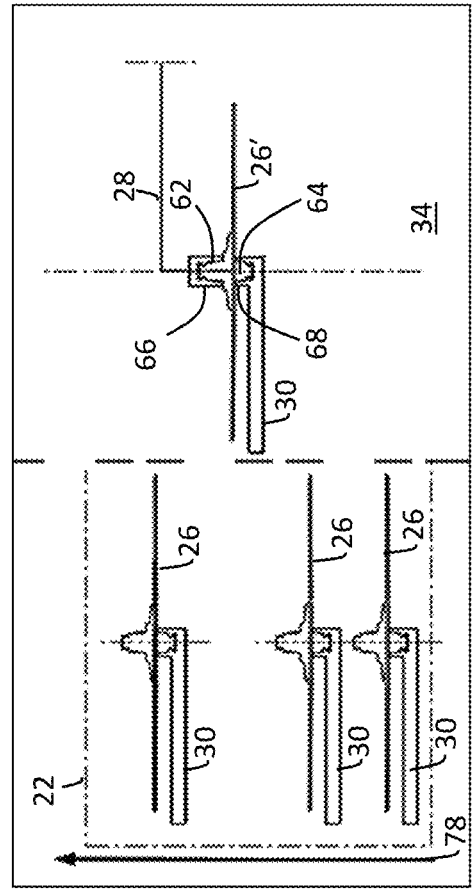
FIG. 11 shows the full storage unit with the next in queue stored blade advancing toward the saw cutting arm.
Figure 12:
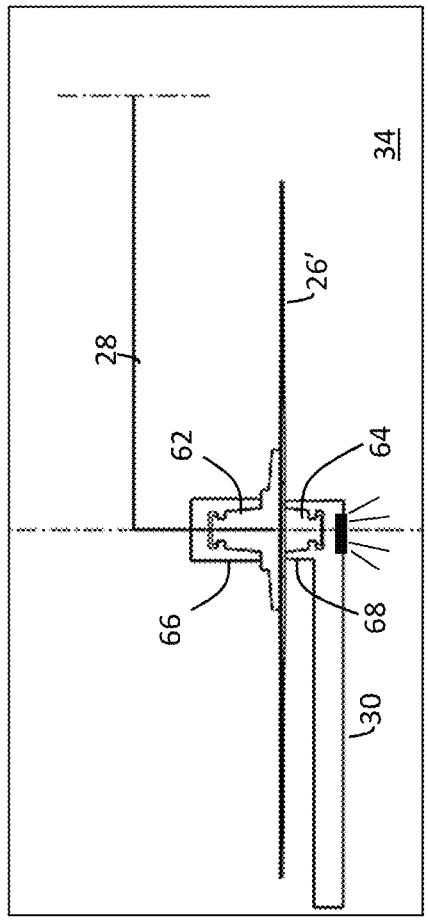
FIG. 12 provides further detail of the exchange of the next in queue stored blade between the full storage unit and the saw cutting arm with the tool holder receptacle of the saw arm deactivated prior to engagement with the saw blade tool holder and tool holder receptacle of the storage unit activated to engage the opposite side saw blade tool holder.
Figure 13:
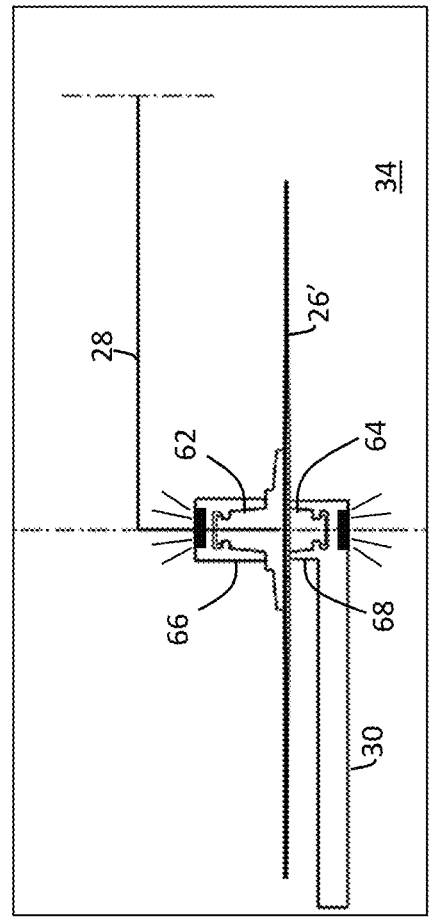
FIG. 13 provides further detail of the exchange of the next in queue stored blade between the full storage unit and the saw cutting arm with the tool holder receptacle of the saw arm activated to engage the saw blade tool holder and tool holder receptacle of the storage unit activated to engage the opposite saw blade tool holder.
Figure 14:
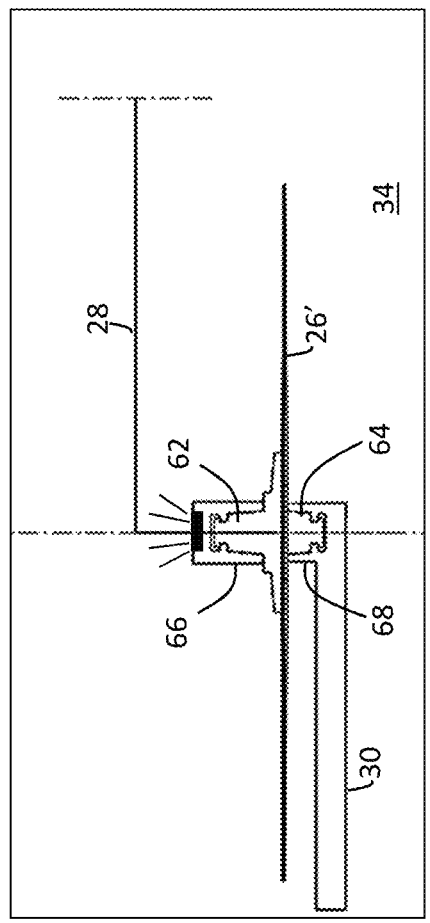
FIG. 14 provides further detail of the exchange of the next in queue stored blade between the full storage unit and the saw cutting arm with the tool holder receptacle of the saw arm activated to engage the saw blade tool holder and tool holder receptacle of the storage unit deactivated to release the opposite side saw blade tool holder.
Figure 15:
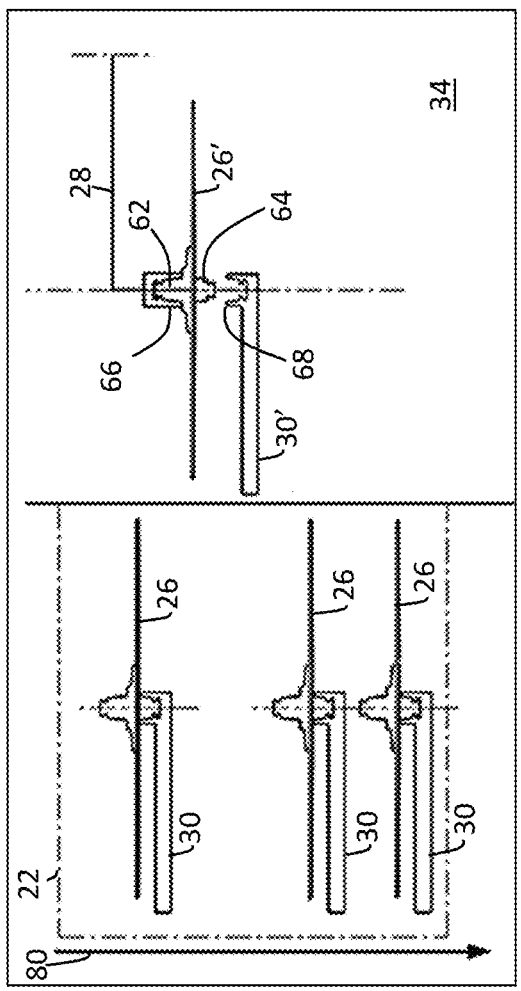
FIG. 15 shows a now empty storage unit moving away from the saw cutting arm.
Figure 16:
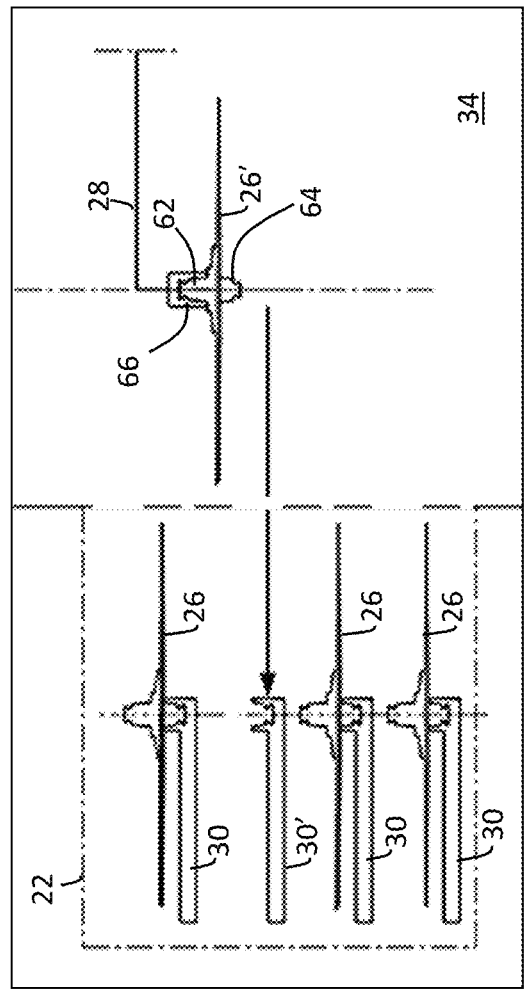
FIG. 16 shows the now empty storage unit back in the array of storage units.
Figure 17:
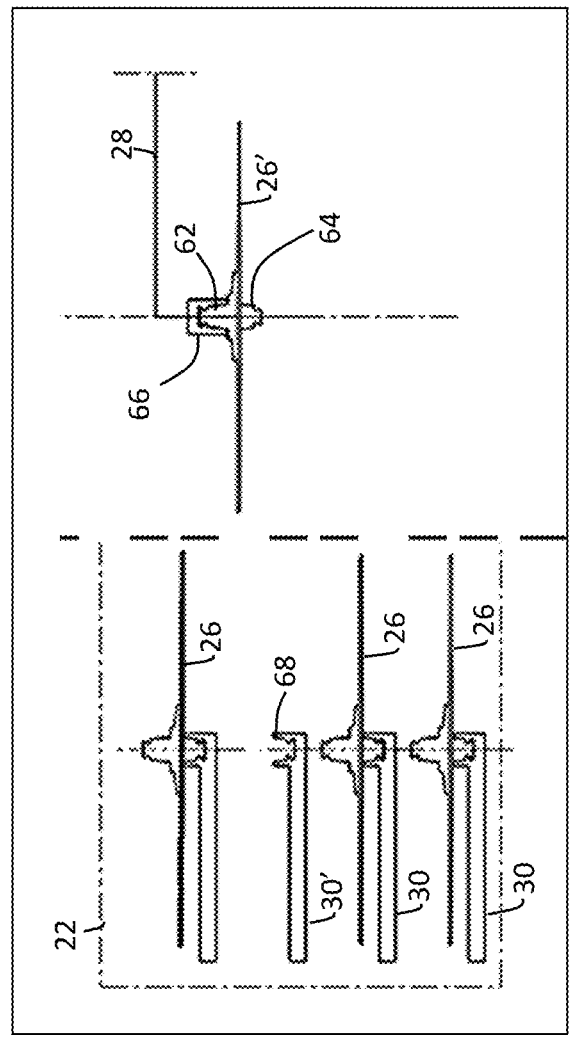
FIG. 17 shows the saw cutting arm returning to a cutting position.

To load the new, next in queue blade 26', the selected storage unit 30" will move from the retracted position within the array 22 to the extended position away from the array into the saw house 34, as shown in FIG. 10. Then, as shown in FIGS. 11-12, the array 22 of storage units will move the appropriate distance in the direction 78 to interface and engage the tool holder 62 on the saw side of the blade 26 to the tool holder receptacle 66 on the saw cutting arm 28. As shown in FIG. 13, the saw cutting arm tool holder receptacle 66 will secure the blade tool holder 62 on the saw cutting arm side of the blade. At this point, the storage unit 30 and saw 34 are connected. As shown in FIG. 14, once secured on the saw arm 38, the storage unit tool holder receptacle 68 will release the blade tool holder 64 on the storage unit 30 side of the blade 26'. As shown in FIG. 15, the entire array 22 of storage units 30 may move in the direction 80 a distance sufficient to allow the tool holder 64 of the storage unit 30 side of the blade 26' to clear the storage unit. As shown in FIG. 16, once clear, the storage unit 30 may retract back into the array 22 of storage units. The retracted storage unit 30 is now considered the empty storage unit in the array of storage units and will be the next storage unit to receive an expired blade as shown in FIG. 17. Equipped with the next in queue blade 26', the saw 24 can resume cutting operations. The sequence of exchange may reoccur until all the blades in the array of storage units are expired. At this point, a new array of storage units with a complement of new blades may be swapped out with the array of expired blades. Although the description and drawings show the saw cutting arm and storage unit with a tool holder receptacle comprising a female collet portion and the blade tool holder comprising a male collet portion extending from the saw side of the blade and storage side of the blade, the features may be reversed.

Figure 18:
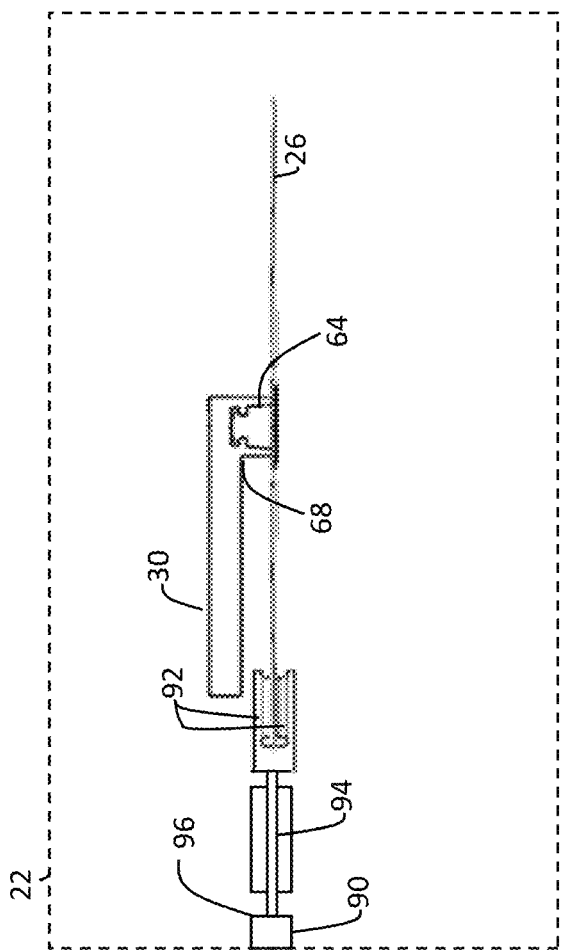
FIG. 18 shows a top view of an exemplary blade cleaner associated with the array and storage units.

The array 22, the storage unit 30, or the saw 24 may be configured with a blade cleaner 90 to allow for cleaning of the blade 26. FIGS. 18-20 shown one embodiment where the storage unit 30 of the array is provided with the blade cleaner 90. In this configuration, the blade cleaner 90 may be provided with a cleaning member 92 for engaging one or both sides of the blade 26 and removing adhesive or other residue from the saw cutting operation. The cleaning member 90 may comprise a brush, a moistened pad, or sponge. Cleaning fluid may be provided to the cleaning member to assist in the cleaning. As shown in FIGS. 19 and 20, the cleaning member 94 may be mounted on a slide 94 having a fixed portion operatively mounted to a side wall or structural member of the array 22 or storage unit 30 and an extension portion slidably connected to the fixed portion to move between a retracted position (FIG. 19) in which the cleaning member 92 is spaced from the blade 26, and an extended position (FIG. 20) in which the cleaning member engages the blade for cleaning the blade. The slide 94 may be driven with an actuator 96 (e.g., electric, pneumatic, hydraulic) or electric motor and screw (e.g., ball screw, lead screw). The storage unit 30 may be configured to rotate the blade via the blade tool holder 64 while the slide 94 is in the extended position and the cleaning member 92 is engaging the blade 26 so as to allow the edge of the blade and a radial distance inward from the edge of the blade to be cleaned. The cleaning may occur on both sides when a cleaning member is positioned on each side of the blade. A fiber optic sensor (not shown) or feedback position (e.g. encoder) may be used to sense the blade edge and provide signals to the actuator for controlling motion of the slide 94 and the positioning the cleaning members 94 relative to the blade edge, thereby allowing the blade cleaner 90 to extend the slide 94 and the cleaning member 92 at varying distances to clean various diameter blades and to prevent cleaning member from extending too far and the blade 26 from adversely impacting the cleaning member and/or slide. In the alternative to that shown in FIGS. 18-20, the cleaning member 92 may be fixed in position within the array or storage unit. As the storage unit is cycled between the extended and retracted positions, the cleaning member may engage and clean the blade as the blade is moved within the storage unit between the extended and retracted positions. The cleaning operation may occur prior to moving a blade from the storage unit to the saw, for instance, as the storage unit moves from the retracted position within the array to extended position, the cleaning member may engage the blade. The cleaning operation may also occur after the blade is transferred from the saw to the storage unit, for instance, as the storage unit moves from the extended position after receiving the blade from the saw to the retracted position within the array, the cleaning member may engage the blade. The saw may also transfer the blade to the storage unit during the saw cutting operation for purposes of cleaning. For instance, the saw may transfer the blade to the storage unit and allow the storage unit to cycle between the extended and retracted positions repeatedly as needed until the blade is cleaned at which point the blade may be returned to the saw via the storage unit and back into service in the cutting operation. The blade may also be rotated in the storage unit (whether in the extended position or retracted position) so as to allow the cleaning member to engage the blade. The cleaning member may also move with rotational or translational motion relative to the blade when engaging the blade for cleaning operations.

In view of the foregoing, it will be seen that the several advantages are achieved and attained. The embodiments were chosen and described in order to best explain the principles of the disclosure and their practical application to thereby enable others skilled in the art to best utilize the various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A tissue log cutting saw having a blade storage array detachably mounted to a structure of the tissue log cutting saw, the blade storage array comprising: a plurality of storage units, each storage unit being configured to store a circular saw blade for the tissue log cutting saw, each storage unit having a tool holder receptacle configured to releasably secure a circular saw blade in the storage unit in a manner such that the circular saw blade defines a plane in the storage unit with the circular saw blades stored in the storage units within the array being aligned coaxially and in parallel planes that are axially spaced within the blade storage array, each storage unit being configured to reciprocate in a linear direction parallel to the plane of the circular saw blade in the storage unit into and out of an interior of the tissue log cutting saw when the array is detachably mounted to the structure of the tissue log cutting saw, each storage unit being configured to reciprocate in the linear direction independently of another storage unit, each storage unit being configured to exchange the saw blade between the tissue log cutting saw and the storage unit when the blade storage array is detachably mounted to the tissue log cutting saw.

2. The array of claim 1 wherein each storage unit is movable between a retracted position and an extended position, wherein when the storage unit is in the retracted position, the storage unit is within the array, and wherein when the blade storage array is detachably mounted to the structure of the saw and the storage unit is in the extended position, the storage unit is configured to extend outward from the array into the interior of the saw.

3. The array of claim 2, wherein when the storage unit is in the extended position without a circular saw blade in the storage unit, the tool holder receptacle of the storage unit is exposed and configured to receive a tool holder exposed from the circular saw blade.

4. The array of claim 2, wherein when the blade storage array is detachably mounted to the tissue log cutting saw, the storage unit tool holder receptacle is configured to operatively connect to a saw cutting arm of the tissue log cutting saw when receiving the saw blade from the saw cutting arm to exchange the saw blade between the tissue log cutting saw and the storage unit.

5. The array of claim 2, wherein when the blade storage array is detachably mounted to the tissue log cutting saw, the storage unit tool holder receptacle is configured to release from a circular saw blade after the circular saw blade is engaged with a saw cutting arm of the tissue log cutting saw when transferring the saw blade to the saw cutting arm.

6. A method comprising:
providing an array with a plurality of storage units, each storage unit being configured to store a circular saw blade for a tissue log cutting saw, each storage unit being configured to exchange a circular saw blade with the tissue log cutting saw when the blade storage array is detachably mounted to the tissue log cutting saw, at least one storage unit in the array being devoid of a circular saw blade, each storage unit having a tool holder receptacle configured to releasably connect with a tool holder of a circular saw blade, other storage units of the array each being provided with a circular saw blade releasably secured on the tool holder receptacle of the respective storage unit in a manner such that the circular saw blade defines a plane in the storage unit with the circular saw blades stored in the storage units within the array being aligned coaxially and in parallel planes that are axially spaced within the array, each storage unit being configured to reciprocate in a linear direction parallel to the plane of the circular saw blade in the storage unit, and each storage unit being and configured to reciprocate in the linear direction independently of another storage unit.

7. The method of claim 6, further comprising releasably mounting the array to a structure of the saw wherein the saw has a cutting arm with a circular saw blade rotatably mounted thereto, the circular saw blade rotatably mounted on the cutting arm defining a plane with first and second sides, the circular saw blade rotatably mounted on the cutting arm having a center axis of rotation, the circular saw blade rotatably mounted on the cutting arm having a tool holder mounted at the center axis extending from the first and second sides of the plane of the cutting arm circular saw blade, the first side tool holder of the circular saw blade rotatably mounted on the cutting arm being configured to releasably connect with a tool holder receptacle of the saw cutting arm.

8. The method of claim 7 further comprising moving the storage unit devoid of the circular saw blade from a retracted position wherein the storage unit devoid of the circular saw blade is within the array to an extended position wherein the storage unit devoid of the circular saw blade is extended outward from the array and axially aligned with the center axis of rotation of the circular saw blade rotatably mounted on the cutting arm.

9. The method of claim 8 further comprising enabling the tool holder receptacle of the storage unit devoid of the circular saw blade to receive the tool holder on the second side of the circular saw blade rotatably mounted on the cutting arm.

10. The method of claim 9 further comprising enabling the saw cutting arm tool holder receptacle to release the tool holder on the first side of the circular saw blade rotatably mounted on the cutting arm.

11. A method comprising:
providing a plurality of circular saw blades, each of the circular saw blades defining a plane with first and second sides of the respective circular saw blade on opposite faces of the plane, each of the circular saw blades having a center axis of rotation, each of the circular saw blades having a tool holder mounted to the respective circular saw blade at the center axis of rotation, the tool holder extending outward from the first and second sides of the respective circular saw blade;
providing an array with a plurality of storage units, each storage unit in the array having a tool holder receptacle being configured to releasably connect with the tool holder of at least one of the circular saw blades for storage of the circular saw blade within the storage unit, and each storage unit in the array being configured to reciprocate in a linear direction parallel to the plane of the circular saw blade stored in the storage unit, each storage unit in the array being configured to reciprocate in the linear direction independently of another storage unit;
releasably connecting at least two circular saw blades in respective storage units via the storage unit tool holder receptacle and the tool holder on the second side of the respective circular saw blade in a manner such that the tool holder on the first side of the respective circular saw blade is exposed and configured for releasable connection with a tool holder receptacle of a cutting arm of a saw, and the respective circular saw blade is aligned coaxially and axially spaced in parallel planes with the other circular saw blade stored in the respective other storage unit within the blade storage array.

12. The method of claim 11 further comprising releasably mounting the array to a structure of the saw.

13. The method of claim 12 further comprising moving the at least one storage unit containing a circular saw blade from a retracted position wherein the at least one blade containing storage unit is within the array to an extended position wherein the at least one blade containing storage unit is extended outward from the array and axially aligned with the blade center axis of rotation.

14. The method of claim 13 further comprising enabling the saw cutting arm tool holder receptacle to receive the tool holder of the first side of the blade.

15. The method of claim 14 further comprising enabling the at least one blade containing storage unit tool holder receptacle to release the tool holder of the second side of the circular saw blade.

16. The method of claim 15 further comprising moving the at least one storage unit from the extended position to the retracted position.

\* \* \* \* \*